June 28, 1955  F. E. WALLMAN  2,712,057

LIGHT ATTACHMENT FOR FISHING REELS

Filed May 26, 1953

INVENTOR
FRANK E. WALLMAN

BY
McMorrow, Berman + Davidson
ATTORNEYS

United States Patent Office 2,712,057
Patented June 28, 1955

2,712,057
LIGHT ATTACHMENT FOR FISHING REELS
Frank E. Wallman, South Walpole, Mass.
Application May 26, 1953, Serial No. 357,610
5 Claims. (Cl. 240—6.4)

This invention relates to fishing reel attachments. More particularly, the invention has reference to an improved lamp means, particularly designed for detachable connection to a fishing reel, in a position in which it will provide desired illumination for the fisherman while at the same time interfering in no way with the regular use of the fishing reel.

An important object of the present invention is to provide a device of the type stated which will be provided with a supporting bracket particularly shaped to insure against interference with passage of the line, or use of a free spool lever, star drag, crank, or other portion of the reel.

Another object is to provide a light attachment as described which will be particularly designed to facilitate its connection to or disconnection from any conventional fishing reel, in minimum time and with maximum ease.

Yet another object is to provide a light attachment as stated which will be so designed as to be confined entirely to one side of the fishing reel, thus to permit full visibility of the reel and full use of the various portions of the reel.

Still another object is to provide a light attachment as stated in which the means for connecting the same to a reel will be particularly designed to allow the device to be secured to any of various reels differing from one another as to the thickness of their reel sides.

Another object of the invention is to provide a device as stated which can be adjusted circumferentially of a reel, so as to be secured to said reel at any desired location thereupon, the attachment being so designed as to direct its illumination upon the reel efficiently, at all times.

Yet another object is to provide a light attachment as described which will be novelly designed in such a manner as to permit the same to be connected to a reel without requiring modification or redesign of the reel in any way.

Other objects will appear from the following description, the claims appended thereto, and from the annexed drawing, in which like reference characters designate like parts throughout the several views, and wherein:

Figure 1:
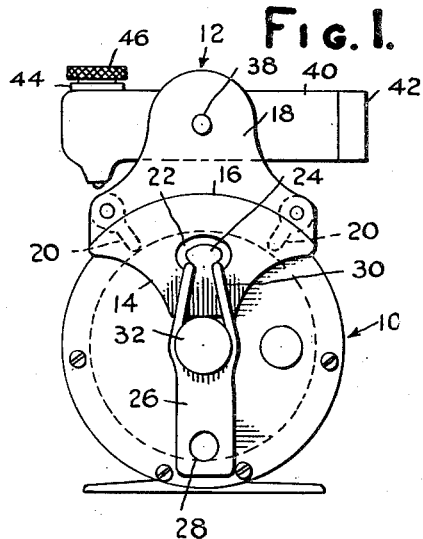
Figure 1 is a side elevational view of a fishing reel, and of a light attachment formed in accordance with the present invention, as it appears when mounted upon the reel.
Figure 2:
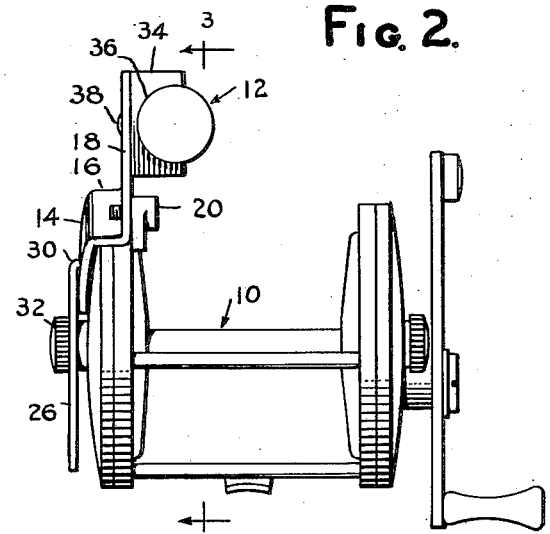
Figure 2 is a front elevational view of said reel, taken from the right of Figure 1.

The reference numeral 10 has been applied in the drawing to designate a thoroughly conventional fishing reel, the reference numeral 12 being applied generally to a light attachment formed in accordance with the present invention.

Figure 4:
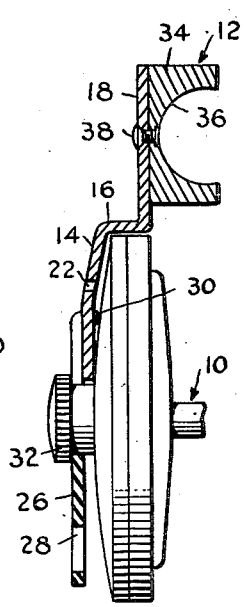
Figure 4 is a sectional view on line 4—4 of Figure 3.

The light attachment includes a bracket, which can be formed from a piece of sheet metal material suitably bent to shape, the material of which the bracket is formed being formed with an offset intermediate opposite ends thereof, thus to define an inner leg 14 so shaped as to substantially complement the exterior configuration of the side of the reel 10 on which the device is to be mounted (see Figure 4). The leg 14 can be tapered in the direction of the center of the reel, as shown in Figure 1, with the smaller end of said leg 14 being engageable against the conventional bearing cap of the reel.

The leg 14 merges, at its larger end, into an arcuate offset or shoulder 16, the offset 16 merging, in turn, into an outer leg 18 of plane formation. The outer leg 18 is generally tapered in a direction away from the offset, as shown in Figure 1. It is important to note that the offset is so curved as to be concentric with the reel side, said offset being engaged with the periphery of the reel side.

By reason of the arrangement illustrated and described, the bracket can be adjusted circumferentially of the reel side on which it is mounted, and in each position to which the bracket is so adjusted, said bracket can be releasably clamped to the reel side, through the medium of transversely spaced lugs 20. The lugs 20 are threadedly engaged in the outer leg 18 of the bracket, adjacent the arcuate offset portion 16, each lug having a radial handle which is engageable against the inner surface of the reel side.

The lugs 20 are adapted to clamp the reel side, in cooperation with the inner leg 14 of the device, regardless of the thickness of said side, the bracket thus being adapted for mounting on any of various reels differing from one another as to the thickness of their sides.

Figure 5:
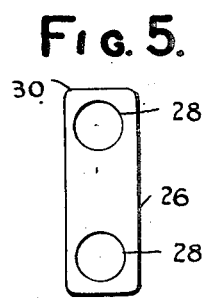
Figure 5 is an elevational view of a resilient connecting element used in the invention.

A resilient element is utilized to bind the offset portion 16 against the periphery of the reel side, in each position to which the bracket is adjusted circumferentially of the reel. Said resilient element is formed as in Figure 5, and constitutes a wide band of soft rubber material or the like, designated by the reference numeral 26, said band having at opposite ends relatively large openings 28. The inner leg 14, medially between the opposite side edges thereof, has a crescent-shaped or C-shaped slot 22 formed therein (Figure 1), said slot defining a tongue 24.

It may be noted, in this regard, that the formation of the openings 28 in the opposite ends of the wide band of resilient material 26 defines relatively narrow, resiliently distendable portions 30, which portions can be stretched so as to be engaged over the tongue 24 and bearing cap 32 of the reel. In this connection, the arrangement causes the bearing cap and tongue to be received in a single opening 28 of the resilient connecting element 26. Two openings 28 are formed in the element 26, however, so as to permit selective use of the openings, thereby to add to the normal life of the resilient connecting element.

Figure 3:
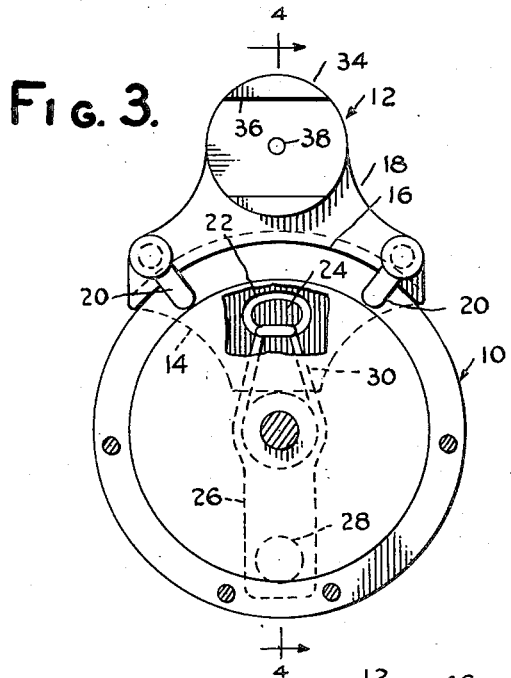
Figure 3 is a sectional view taken substantially on line 3—3 of Figure 2, the lamp means being removed.

Carried by the outer leg 18 of the bracket is a holder 34, said holder being formed from a block of material of circular outer configuration (Figure 3), the holder having an end to end recess 36. The recess 36 is formed to a substantially semicircular cross section, the recess extending, however, through slightly more than one-hundred eighty degrees of a circle (Figure 4). By reason of this arrangement, the opposite walls of the recess, which are resilient, may be sprung outwardly, to releasably grip a tubular battery casing, in a manner to be made presently apparent.

The holder 34 is connected to the outer leg 18 of the bracket by means of a rivet 38, the holder thus being swivelly connected to the bracket. The riveted connection is such, however, as to frictionally engage the holder against the outer leg 18 in each position to which the holder is pivoted about the axis defined by the rivet.

Figure 6:
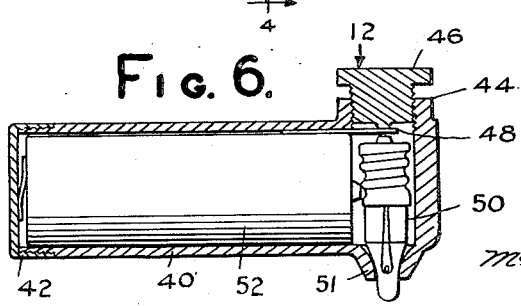
Figure 6 is a longitudinal sectional view through the lamp means, per se.

The lamp means carried by the holder 34 has been shown in detail in Figure 6, and includes a tubular, hollow casing 40, said casing being adapted to receive a conventional flashlight battery. The casing is formed open at one end, and is exteriorly threaded at its open end, for attachment of a closure cap 42 thereto. The closure cap, of course, facilitates insertion or removal of batteries, and may be of any desired type, so long as it is readily removable from the casing 40.

At that end thereof remote from the cap 42, the casing 40 has a laterally projected annulus 44, interiorly threaded to receive a complementarily threaded switch member 46. Member 46 is of plug-like formation, and is adapted to shift inwardly or outwardly of the casing a springable switch blade 48.

The switch blade 48 is shiftable into engagement with the base of a conventional flashlight bulb 50. The bulb 50 has its other end projected through an apertured annulus 51 formed upon the side wall of the casing 40. By reason of this arrangement, the beams of the lamp bulb are projected laterally of the casing, so as to be directed against the interior of the fishing reel during the fishing operations.

Engageable against the side of the lamp bulb base is the center post of a battery 52, extending within the tubular casing 40.

It will be seen that by threading of the switch member 46 inwardly of the casing 40, the lamp bulb will be illuminated. Conversely, when the switch member is backed off, the bulb will be turned off.

The construction illustrated and described has certain important advantages, among which are the adaptability of the device for mounting of the same on various conventional reels differing from one another as to the particular size and design thereof, the adaptability of the device for adjustment circumferentially of the associated reel, and the design, that promotes the illumination of the reel without interference with operation of the crank, star drag, etc. As to this last, the entire device is mountable upon that side of the reel remote from these portions of the reel, this being an important structural characteristic of the arrangement illustrated and described herein.

It is also important to note that the device can be detached from the reel with speed and ease, whenever it is not to be used.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. In a light attachment for a fishing reel having a bearing cap, a bracket supportable on one side of a fishing reel, said bracket having relatively offset, substantially parallel, inner and outer legs with the inner leg disposed in juxtaposition to said reel side and the outer leg projecting outwardly from said side, the relative offsetting of the legs defining a reel-periphery-engaging shoulder therebetween; a resilient connecting element engageable with said bracket and with the bearing cap of said reel side, and tensioned to shift the bracket radially and inwardly of the reel to bind the shoulder against the periphery of said reel side; and a lamp holder carried by said outer leg of the bracket.

2. In a light attachment for a fishing reel having a bearing cap, a bracket supportable on one side of a fishing reel, said bracket having relatively offset, substantially parallel, inner and outer legs with the inner leg disposed in juxtaposition to said reel side and the outer leg projecting outwardly from said side, the relative offsetting of the legs defining a reel-periphery-engaging shoulder therebetween; a resilient connecting element engageable with said bracket and with the bearing cap of said reel side, and tensioned to shift the bracket radially and inwardly of the reel to bind the shoulder against the periphery of said reel side; and a lamp holder carried by said outer leg of the bracket, said shoulder being of curved formation to complement the curvature of the periphery of the reel side.

3. In a light attachment for a fishing reel having a bearing cap, a bracket supportable on one side of a fishing reel, said bracket having relatively offset, substantially parallel, inner and outer legs with the inner leg disposed in juxtaposition to said reel side and the outer leg projecting outwardly from said side, the relative offsetting of the legs defining a reel-periphery-engaging shoulder therebetween; a resilient connecting element engageable with said bracket and with the bearing cap of said reel side, and tensioned to shift the bracket radially and inwardly of the reel to bind the shoulder against the periphery of said reel side; a lamp holder carried by said outer leg of the bracket, said shoulder being of curved formation to complement the curvature of the periphery of the reel side; and a plurality of lugs threadedly engaged in said outer leg adjacent the shoulder, the lugs being spaced longitudinally of the shoulder, and having radial handles lying in planes parallel to the general plane of the inner leg, said handles being shiftable toward the inner leg to clampably engage said reel side between the handles and said inner leg in the periphery-engaging position of the shoulder.

4. In a light attachment for a fishing reel having a bearing cap, a bracket supportable on one side of a fishing reel, said bracket having a relatively offset, substantially parallel, inner and outer legs with the inner leg disposed in juxtaposition to said reel side and the outer leg projecting outwardly from said side, the relative offsetting of the legs defining a reel-periphery-engaging shoulder therebetween; a resilient connecting element engageable with said bracket and with the bearing cap of said reel side, and tensioned to shift the bracket radially and inwardly of the reel to bind the shoulder against the periphery of said reel side; and a lamp holder carried by said outer leg of the bracket, said inner leg being formed with a crescent-shaped slot formed with inturned ends defining a tongue having a base of reduced size, the resilient element being tensioned between the tongue and said bearing cap.

5. In a light attachment for a fishing reel having a bearing cap, a bracket supportable on one side of a fishing reel, said bracket having relatively offset, substantially parallel, inner and outer legs with the inner leg disposed in juxtaposition to said reel side and the outer leg projecting outwardly from said side, the relative offsetting of the legs defining a reel-periphery-engaging shoulder therebetween; a resilient connecting element engageable with said bracket and with the bearing cap of said reel side, and tensioned to shift the bracket radially and inwardly of the reel to bind the shoulder against the periphery of said reel side; and a lamp holder carried by said outer leg of the bracket, said inner leg being formed with a crescent-shaped slot formed with inturned ends defining a tongue having a base of reduced size, the resilient element being tensioned between the tongue and said bearing cap, said element having an opening receiving both the tongue and the bearing cap, the opening being elongatable in response to tensioning of the element, and being formed adjacent one end of the element so as to define at said end a narrow, resiliently distendable portion stretchable about the base of the tongue.

References Cited in the file of this patent
UNITED STATES PATENTS

| | | |
|---|---|---|
| 2,283,430 | Frettem | May 19, 1942 |
| 2,354,853 | Dobbs | Aug. 1, 1944 |
| 2,597,662 | Melamed et al. | May 20, 1952 |